May 23, 1961 T. I. RESS 2,985,763

ELECTRO-OPTICAL BINARY COUNTER

Filed Jan. 24, 1956

2 Sheets-Sheet 1

INVENTOR.
THOMAS I. RESS

May 23, 1961 T. I. RESS 2,985,763

ELECTRO-OPTICAL BINARY COUNTER

Filed Jan. 24, 1956 2 Sheets-Sheet 2

INVENTOR.
THOMAS I. RESS 2,985,763

ELECTRO-OPTICAL BINARY COUNTER

Thomas I. Ress, Poughkeepsie, N.Y., assignor to International Business Machines Corporation, New York, N.Y., a corporation of New York Filed Jan. 24, 1956, Ser. No. 560,938

6 Claims. (Cl. 250—208)

This invention relates to a counting device, and particularly to an electro-optical device for operation in a binary sequence. The device disclosed herein is similar in certain respects to the electro-optical accumulator disclosed in my co-pending application Serial No. 557,381, filed January 4, 1956.

In an effort to improve and speed up the process of machine calculation, numerous techniques have been developed employing electronic and even electro-optical devices. These electronic calculating devices generally employ numerous components. As for the electro-optical calculating devices, they consist of a light generating source whose beam transmission is logically controlled by deflecting elements before operating certain photoelectric cells. In these electro-optical arrangements, one photoelectric cell must be employed for each position of counting or accumulating and each such position cell must be externally activated. The large number of components and the rigidity of operation resulting from these prior electro-optical calculating techniques does not make for the most efficient type of operation.

Therefore, it is the principal object of this invention to provide an efficient and economical electro-optical calculating device.

Another object is to provide such a calculating device in which light-responsive elements register a plurality of light pulses in codal form.

Another object is to provide an improved electro-optical counter.

According to this invention, the counter consists of a number of photoconductors and electro-luminescent spots all of which are electrically interconnected in a manner to register digit representing light pulses. Each counting position comprises a pair of input photoconductors that are activated by digit representing light pulses. One of these input photoconductors, upon activation, energizes an output phosphor spot which records and manifests the value represented by the light pulse. An electro-optical loop circuit formed by this input photoconductor and the output spot stores the value entered into the counter until the next light pulse arrives, or the counter is reset to zero. The appearance of every second or even light pulse in a counting position activates the other input photoconductor, which serves to energize a carry phosphor spot for the purpose of transferring the value in the lower counting position to a higher counting position. The carry phosphor spot also brings about the de-energization of the output phosphor spot.

Other objects of the invention will be pointed out in the following description and claims and illustrated in the accompanying drawings, which disclose, by way of examples, the principle of the invention and the best mode, which has been contemplated, of applying that principle.

Generally, the invention consists of electrically and optically interconnected conventional photoconductors and electro-luminescent spots in the form of a binary counter. Such a counter is composed of basic electro-optical circuits. For example, the series connection of a photoconductor element and a phosphor spot permits the spot to be activated when the photoconductor receives a light pulse. The series operation of electro-luminescent and photoconductive material is described in Review of Scientific Instruments (June 1953), vol. 24, No. 6, pp. 471–472. In the parallel connection of a photoconductor and phosphor spot, the appearance of a light pulse on the photoconductor de-energizes or quenches the phosphor spot. Two photoconductors in series with a phosphor spot permit the spot to be activated only if both photoconductors receive light pulses. These interconnected components may be placed in printed circuit fashion on an insulated base of a lmited dimension with a thin conductive strip between the components. The preferred arrangement is to print the photoconductors and electro-luminescent spots closely together on both sides of a transparent plate such as glass. The disposition of phosphor material and photoconductor material on opposite sides of a transparent insulator for optical coupling purposes is described in Mellon Institute of Industrial Research, Quarterly Report No. 3 of the Computer Components Fellowship (First series) April 11, 1951 to July 11, 1951, section VI, Optical Components for Digital Computers (page VI–9 and VI–10). A conventional opaque masking plate may be used where a photoconductor must be shielded from adjacent light sources, that is, where feedback is not required.

Figure 1:
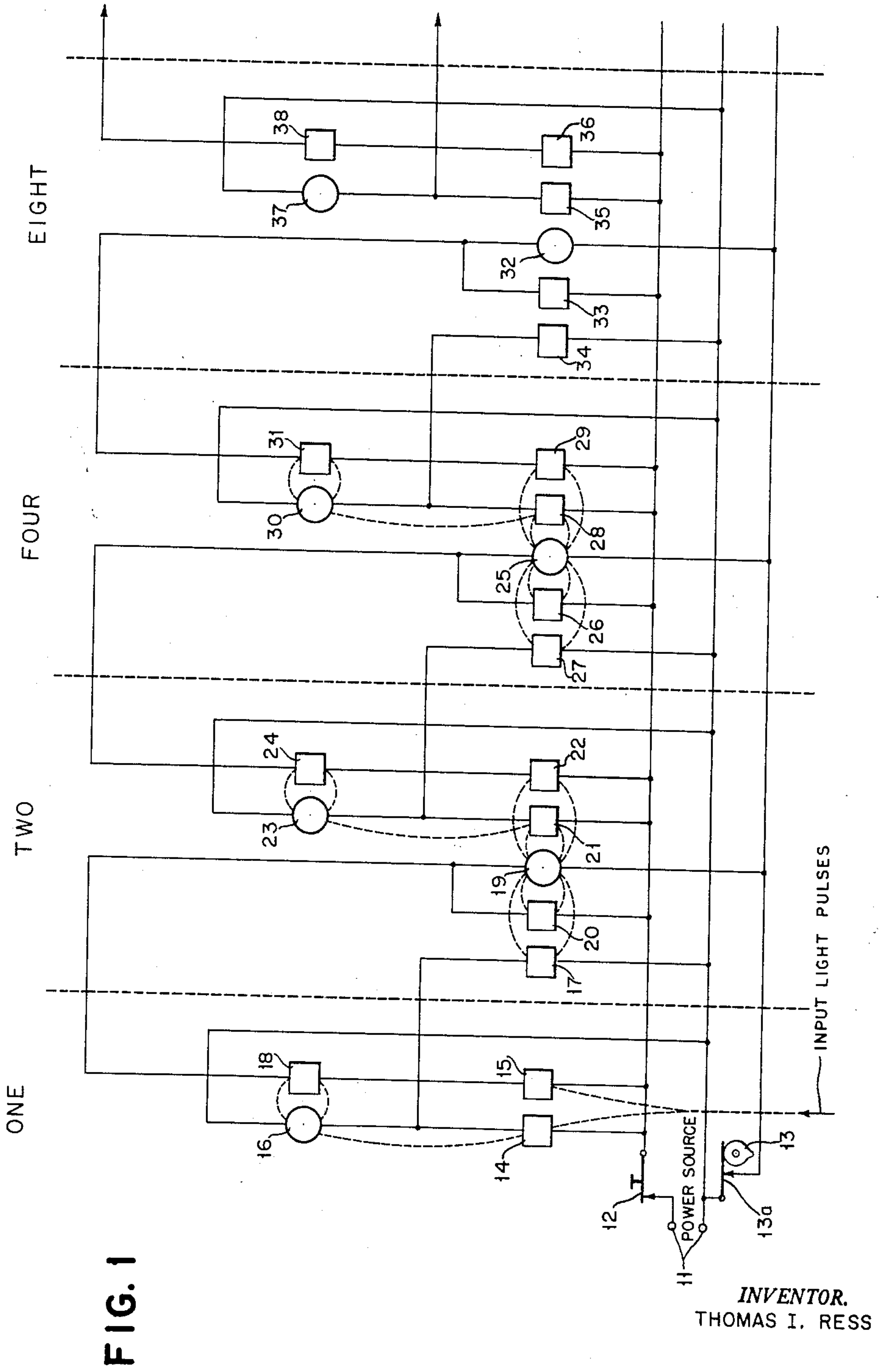
Fig. 1 is a schematic diagram showing an electro-optical counter, according to the invention.
Figure 2:
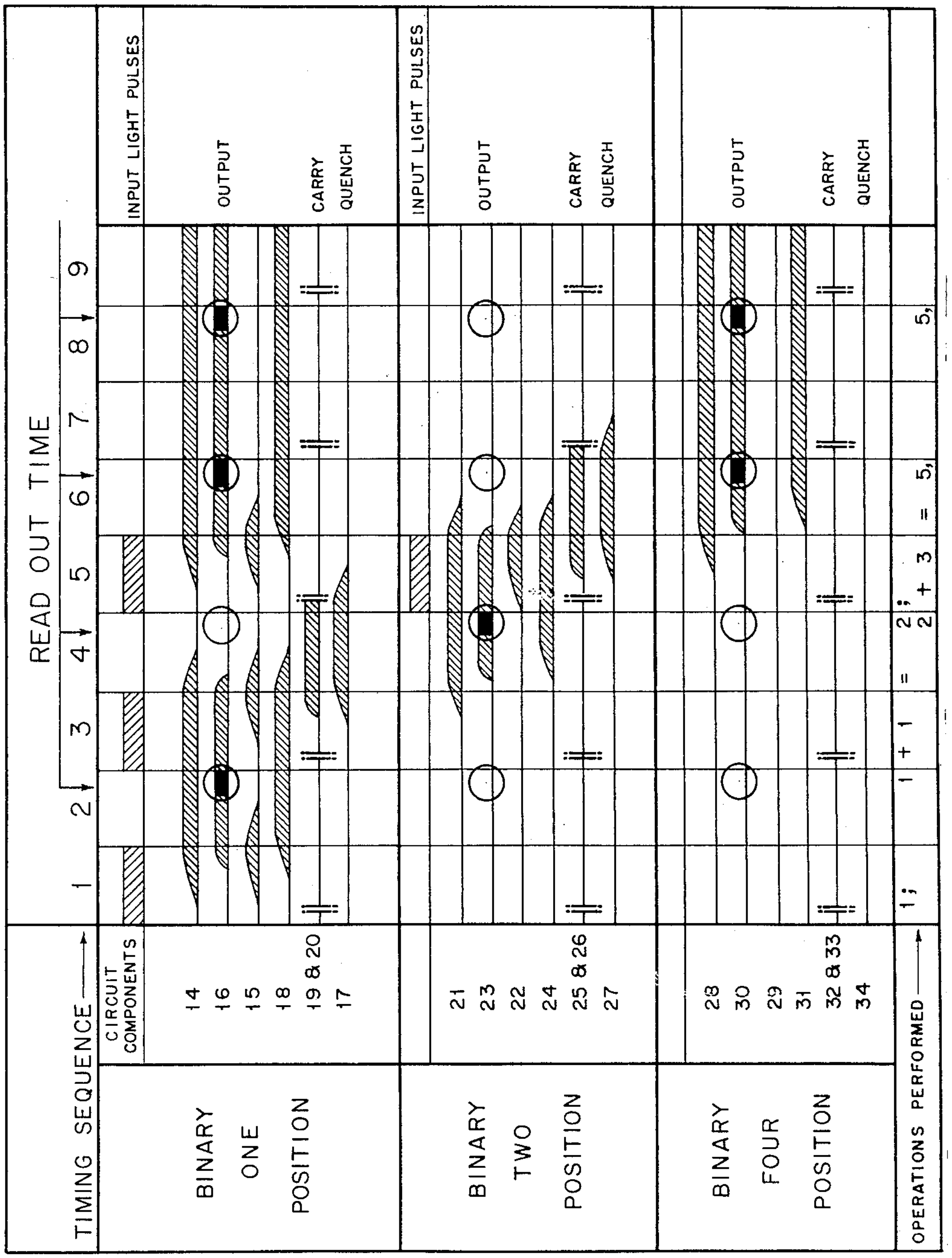
Fig. 2 illustrates a timing chart of operation.

Fig. 1 illustrates the electrical and optical connections forming a four position binary accumulator. The solid lines between the components indicate electrical connections, and the dotted lines represent optical connections. The squares represent photoconductors, and the circles represent electro-luminescent phosphor spots.

According to this invention, a suitable source of electrical energy 11 provides the necessary A.C. power, for example, 600 volts, through reset switch 12, to all input photoconductors and all output phosphor spots. Reset switch 12 may be designed to operate manually or automatically. Cam 13, with its associated contacts 13*a*, serves to connect the energy source 11 to the carry spots in each binary order. The counter is thereby capable of recording light pulses and transferring this information between the binary positions, only when reset switch 12 and cam contacts 13*a* are closed.

As shown in Fig. 1, each of the counting positions has two input photoconductors which are subjected to the light pulses to be counted. With regard to the binary one position, input photoconductors 14 and 15 are subjected simultaneously to input light pulses which may be supplied, for example, by a Lucite tube of Y configuration whose stem portion receives the light pulses and whose diverging branch portions are optically coupled to photoconductors 14 and 15, respectively, to communicate the received light pulses thereto. A Lucite tube of this sort is disclosed on page 471 of the previously referred to (June 1953) issue of Review of Scientific Instruments, and, also in my co-pending application Serial No. 557,381, filed January 4, 1956. Input photoconductor 14 is directly connected to input phosphor spot 16 and photoconductor 17, and therefore, conducts current to both these components when a light pulse impinges on photoconductor 14. Photoconductor 15, on the other hand, conducts current to photoconductor 18 for energizing the latter after a light pulse impinges on photoconductor 15.

Photoconductors 15 and 18 have different light-response times to prevent both photoconductors from being energized simultaneously upon the application of the first and every odd numbered light pulse. More specifically, since the input light pulses impinge on both input photoconductors 14 and 15 simultaneously, photoconductor 15 is activated at the same time as photoconductor 14, and both conduct current to output spot 16 and photoconductor 18, respectively. Thereupon, output spot 16 becomes energized, providing radiant energy for photoconductor 18. However, because the response time of photoconductor 18 is delayed, photoconductor 18 cannot be activated until the end of the input light pulse, and before photoconductor 18 can be fully activated by output spot 16, photoconductor 15 becomes de-activated as a result of the termination of the input light pulse. Only when the second and every even light pulse is applied will both photoconductors be activated simultaneously.

Since photoconductors 15 and 18 are in series with carry spot 19, it is necessary that both these photoconductors be activated simultaneously if carry spot 19 is to be lighted. It is important that the input light pulse be of a duration which is sufficient for input photoconductor 15 to bring series-connected photoconductor 18 into an active state before photoconductor 15 is returned to its inactive state. That is to say, as photoconductor 18 reaches the point of being activated as a result of current provided by input photoconductor 15 and light beams transferred by output spot 16, input photoconductor 15 reaches the point of de-activation. Therefore, carry spot 19 is incapable of activation during the time that the first and every odd numbered light pulse is being recorded in the counter.

Output phosphor spot 16 develops a closed loop with input photoconductor 14, through an optical feedback arrangement, during the time that input conductor 14 receives a light pulse. Photoconductor 14 and electroluminescent spot 16 are assumed to be on opposite sides of a glass plate. After the light pulse has been terminated, the radiant energy fed back by spot 16 to photoconductor 14 serves to make this photoconductor conductive, and the electrical energy which photoconductor 14 makes available to output spot 16 generates further radiant energy, in this way forming a closed loop. Spot 16 also maintains photoconductor 18 activated upon the termination of the first light pulse. As in the case of photoconductor 14, photoconductor 18 is assumed to be located on a glass plate opposite spot 16. Photoconductors 14 and 18 may be on the same side opposite a larger spot 16 or on separate plates opposite spot 16. Output spot 16 will continue to operate photoconductors 14 and 18 until output spot 16 is quenched or de-energized by the activation of its parallel connected photoconductor 17.

The counter will now be described in terms of its ability to count light pulses that are serially entered through the binary one position circuit. As stated above, the entry of the first digit representing light pulse brings about the energization of output spot 16, which is then maintained in an energized state by the photoconductor 14.

An explanation of the conjoint operation of photoconductor 14 and phosphor spot 16 is as follows. Ignoring, for the time being, the effect of the photoconductor 17, the photoconductor 14 and the phosphor spot 16 are connected in series and, therefore, divide between them the A.C. voltage from source 11 in proportion to the relative impedance values of these elements. In the absence of light incident on photoconductor 14, the impedance of the photoconductor 14, relative to that phosphor spot 16, is sufficiently high to maintain the voltage across the spot below a value at which the spot will become and remain electroluminescent. The impingement of the first light pulse on photoconductor 14 reduces the impedance thereof to the extent of momentarily increasing the voltage across spot 16 to a point where the spot becomes electroluminescent. Thereafter, the light received by photoconductor 14 from spot 16 maintains the impedance of the photoconductor sufficiently reduced that the voltage across the spot continues to excite the spot into electroluminesense.

The second input pulse activates input photoconductors 14 and 15. Since photoconductor 14 is in an activated state at this time, as a result of its feedback arrangement with spot 16, the activation of photoconductor 14 has no effect on the circuit at this time. However, the activation of photoconductor 15, at the same time that photoconductor 18 is activated by output spot 16, illuminates carry spot 19. The energization of carry spot 19 then causes photoconductors 17 and 20 to be activated. Inasmuch as photoconductor 17 receives radiant energy from carry spot 19 and electrical energy from photoconductor 14, photoconductor 17 is activated to quench output spot 16. Photoconductor 20 maintains carry spot 19 illuminated until cam 13 opens contacts **13*a***.

As an explanation of how spot 19 becomes illuminated, the photoconductors 15 and 18 in series and the photoconductor 20, in parallel with this series combination, together provide a net photoconductive impedance which is in series with phosphor spot 19, and which is interposed between this phosphor spot 19 and the source 11 of A.C. voltage. Thus the A.C. voltage from source 11 will be divided between this net photoconductive impedance and the spot 19 in proportion to the relative impedance values thereof. The photoconductor 20 initially is dark. So long as light is incident on neither photoconductor 15 or 18, or incident on photoconductor 18 only, the value of the net photoconductive impedance, relative to that of spot 19, is sufficient to maintain the voltage across the spot below a value at which the spot will become electroluminescent. When however, photoconductor 18 is illuminated from spot 16 and when, at the same time, the second light pulse is incident on photoconductor 15, the net photoconductive impedance is so reduced that the voltage across spot 19 rises to a value where the spot becomes illuminated. When the spot 19 becomes illuminated, the light therefrom, which is incident on photoconductor 20, reduces the impedance of this last named photoconductor to maintain the net photoconductive impedance at a value where the voltage developed across spot 19 continues to excite it into electroluminescence, even after both of photoconductors 15 and 18 have returned to the dark state.

The quenching action of the photoconductor 17 is as follows. As previously explained, the series combination of photoconductor 14 and phosphor spot 16 provides a voltage dividing effect which, when photoconductor 14 receives light from spot 16, serves to maintain the voltage across spot 16 at a value which continues to excite the spot into electroluminesense. This previous explanation assumes that the photoconductor 17 is dark, and that the series combination of elements 14 and 16 operates as previously described, despite the fact that, because photoconductor 17 is in parallel with spot 16, the combined dark impedance of photoconductor 17 and impedance of spot 16 is a net effective impedance which is in series with photoconductor 14, and which is somewhat less than the impedance which would be in series with this photoconductor if only the spot 16 were present.

Consider now what happens when photoconductor 17 receives light from phosphor spot 19. The ensuing reduction in impedance of photoconductor 17 reduces the combined impedance (of photoconductor 17 and spot 16) to a point where, due to the voltage dividing action provided by this combined impedance and the impedance of photoconductor 14 when illuminated, the voltage across spot 16 no longer is able to sustain the spot 16 in illuminated condition. Under these circumstances, the light output from spot 16 terminates to thereby cause the impedance of photoconductor 14 to rise to its dark impedance value. As previously explained photoconductor 14, when at its dark impedance value, prevents spot 16 from becoming illuminated.

At the same time that carry spot 19 activates quenching photoconductor 17 for the purpose of de-energizing output spot 16, carry spot 19 causes output spot 23 in the binary two position to be illuminated in the following manner. The illumination of carry spot 19 brings about a transfer of radiant energy to the binary two position input conductors 21 and 22. The activation of photoconductor 21 develops a current which illuminates output spot 23. Soon after this spot is energized, it feeds back radiant energy to photoconductor 21, thereby developing a closed loop for storing a digit 2.

Photoconductor 22 is also activated by the radiant energy made available by carry spot 19. Before photoconductor 24 can be simultaneously activated by the radiant energy provided by output spot 23, photoconductor 22 is caused to be de-actived. This is accomplished by the de-energization of carry spot 19 as a result of the opening of cam contacts **13*a*. The momentary de-energization of carry spot 19 terminates the loop circuit formed by carry spot 19 and photoconductor 20. Since radiant energy is not available for the short interval in which contacts 13*a* are open, photoconductor 20 is de-activated and unable to develop current for spot 19. The subsequent closure of cam contacts 13*a* cannot re-energize this loop circuit, since photoconductor 20 can only be activated by the simultaneous application of radiant and electrical energy. It should be clear that the operation of cam 13** must be synchronized with the input light pulses.

At the time that the third light pulse is entered into the binary one circuit, all the elements in the binary one circuit are in a de-activated state. The de-activated condition of output spot 16 indicates an absence of a digit 1 value in the counter. Carry spot 19 is also deactivated at this time, as explained above. Only input photoconductors 21 and 24 and output spot 23 in the binary two circuit are in an activated state. Output spot 23 continues to maintain input photoconductor 21 and output photoconductor 24 in an activated state.

The appearance of a third light pulse in the binary one circuit activates photoconductors 14 and 15. The effect of this light pulse on the binary one circuit is similar to that in which the first light pulse had been entered. That is to say, output spot 16 is energized, forming a loop circuit with photoconductor 14. Carry spot 19 cannot be energized at this time. Therefore, at the end of the third light pulse, output spots 16 and 23 are illuminated to indicate the absence of a digit 3. The opening of cam contacts **13*a* at the end of the third input puluse has no effect on the accumulator since carry spot 19** and all the other carry spots are in a de-energized state.

The input of a fourth light pulse to the binary one circuit has an effect on this circuit identical to that already explained in the case of the second light pulse. That is to say, photoconductors 15 and 18 are simultaneously activated to energize carry spot 19, whose radiant energy activates photoconductor 17 and brings about the de-energization of output spot 16. The radiant energy transferred from carry spot 19 to photoconductor 21 has no effect on the binary two circuit inasmuch as photoconductor 21 is already in an active state. However, the transfer of radiant energy from carry spot 19 to photoconductor 22 places photoconductors 22 and 24 simultaneously in an activated condition. The electrical energy which is now transferred from photoconductor 24 to carry spot 25 puts this carry spot in an illuminated state. Carry spot 25 then transfers radiant energy to photoconductors 26, 27, 28 and 29. The activation of photoconductor 26 develops a loop circuit with carry spot 25 for the purpose of keeping carry spot 15 energized until cam contacts **13*a* are opened. The activation of photoconductor 27, which is parallel to output spot 23, causes photoconductor 27 to quench output spot 23**.

The activation of photoconductor 28, on the other hand, by the radiant energy transferred from carry spot 25, causes output spot 30 of the binary four circuit to be illuminated, developing a loop circuit between photoconductor 28 and output spot 30. The transfer of radiant energy from carry spot 25 to photoconductor 29 has no effect on the binary four circuit, as previously explained with regard to the binary one and two circuits. After the entry of the fourth input light pulse, when cam contacts **13*a* are opened, output spot 30** alone is illuminated to indicate a digit 4 in the counter.

The entry of subsequent light pulses in a counting sequence will in a similar fashion operate the electro-optical counter. That is to say, the entry of a fifth pulse into the binary one circuit will cause output spots 16 and 30 to be illuminated. A sixth pulse would cause output spot 16 to be de-energized and output spots 23 and 30 to be illuminated. The entry of a seventh pulse would bring about the illumination of output spots 16, 23 and 30.

The entry of an eighth light pulse causes output spots 16, 23 and 30 to be de-energized and output spot 37, which represents 8, to be energized in the following manner. The appearance of the eighth light pulse in the binary one circuit energizes photoconductors 15 and 18 simultaneously to illuminate carry spot 19, which activates photoconductor 17 to quench spot 16. Carry spot 19 also brings about the simultaneous activation of photoconductors 22 and 24 to illuminate spot 25. The radiant energy from spot 25 then activates photoconductor 27 to quench spot 23. The radiant energy from carry spot 25 also brings about the simultaneous activation of photoconductors 29 and 31 for the purpose of illuminating carry spot 32. The radiant energy from carry spot 32, in turn, activates photoconductor 34, thereby bringing about the de-energization of output spot 30. At the same time, the radiant energy transferred by carry spot 32 to photoconductor 35 illuminates output spot 37, which represents a value of 8 in the counter.

It may thus be clearly seen that the counter, according to this invention will serve to count in the binary notation. To reset the counter at the end of a selected sequence of entries, it is only necessary to open switch 12, thereby cutting off the input photoconductors and the locking photoconductors associated with each carry spot from power source 11.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a binary counting device, a source of digit representing light pulses, and comprising in each counting position: first and second solid photoconductors each of said conductors being responsive to light pulses, a first phosphor spot activated by said first photoconductor for recording and manifesting a value in the counter, a third solid photoconductor controlled by said first phosphor spot and said second photoconductor, a second phosphor spot activated by said second and third photoconductors for indicating a carry condition, a fourth solid photoconductor controlled by said second phosphor spot and said first photoconductor and controlling said first phosphor spot, and a fifth solid photoconductor controlled by said second phosphor spot and forming a loop circuit therewith, with said second phosphor spot controlling the first photoconductor in the next higher counting position for the purpose of transferring digit representing radiant energy to the higher counting position.

2. In an electro-optical binary counting device, a source of electrical energy, a source of digit representing light pulses, first and second solid input photoconductors each connected to said electrical energy source and each responsive to said light pulses to be activated thereby, a value representing phosphor spot in circuit with said source and first photoconductor to become illuminated when said first photoconductor is activated by a first of said pulses, a carry phosphor spot, a control photoconductor electrically in circuit with said second input photoconductor and carry phosphor spot, and optically coupled to said value representing phosphor spot to receive light therefrom when said last named spot is illuminated, said control photoconductor being responsive to said light to render said carry spot illuminated at a time when said second input photoconductor is activated by a second of said pulses, and a quenching photoconductor electrically in circuit with said first input photoconductor and value representing spot and responsive to light developed by said carry spot upon becoming illuminated to quench the illumination of said value representing spot, the aforesaid photoconductors and spots comprising in said device a first section corresponding to a first counting position and adapted to register, by said value representing spot, the first and each odd numbered light pulse received by said first section, and said device being also comprised of at least a second section similar in circuitry and operation to said first section and corresponding to a second counting position, the first and second input photoconductors of said second section being optically coupled to the carry spot of said first section to be activated by light therefrom when said last named spot becomes illuminated, whereby the second and each even numbered pulse received by said first section is carried to said second section.

3. The invention according to claim 2, wherein the value representing phosphor spot in each counting position is in series with said first input photoconductor and forms an electro-optical loop therewith upon the receipt of the first and each odd numbered light pulse, the loop circuit being operative to register the input value until the appearance of the second and each even numbered light pulse in the same counting position.

4. The invention according to claim 2, wherein said second input photoconductor, the control photoconductor, and the carry phosphor spot are series connected in each counting position to energize the carry phosphor spot upon the arrival of a second and each even numbered light pulse in a particular counting position.

5. The invention according to claim 4, wherein the quenching photoconductor and the value representing phosphor spot in each counting position are parallel connected, the quenching photoconductor being activated by radiant energy provided by the carry phosphor spot to quench the value representing phosphor spot at the time that a carry is made to the next higher counting position.

6. The invention according to claim 4, wherein the carry phosphor spot and the control photoconductor form a closed loop, upon the energization of the phosphor spot, for a time interval sufficient to develop a carry light pulse for the next higher counting position.

References Cited in the file of this patent

UNITED STATES PATENTS

| | | |
|---|---|---|
| 2,627,587 | Kohler | Feb. 3, 1953 |
| 2,665,068 | Williams | Jan. 5, 1954 |
| 2,702,158 | Winter | Feb. 15, 1955 |
| 2,727,683 | Allen et al. | Dec. 20, 1955 |
| 2,735,936 | Gridley | Feb. 21, 1956 |
| 2,742,631 | Rajchman et al. | Apr. 17, 1956 |